Patented Sept. 29, 1953

2,653,942

UNITED STATES PATENT OFFICE 2,653,942

THIOISONICOTINAMIDE

John Lee, Essex Fells, N. J., assignor to Hoffmann-La Roche Inc., Nutley, N. J., a corporation of New Jersey No Drawing. Application August 15, 1951,
Serial No. 242,040

1 Claim. (Cl. 260—294.8)

This invention relates to the new compound thioisonicotinamide having the structural formula:

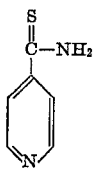

The compound is useful in the field of therapeutics, and more particularly as an antituberculous compound.

Thioisonicotinamide can readily be prepared by reacting isonicotinonitrile with hydrogen sulfide in the presence of methanolic ammonia.

The following example will serve to illustrate the preparation of thioisonicotinamide.

*Example*

22 grams of isonicotinonitrile were dissolved in 200 cc. of methanol containing 20 per cent ammonia by weight. The solution was saturated with hydrogen sulfide and permitted to stand at 25° C. for 48 hours. A yellow crystalline product separated which was recovered by filtration and recrystallized from hot water. The thioisonicotinamide thus obtained melted at 203–204° C. The compound is only slightly soluble in cold water.

I claim:
Thioisonicotinamide.

JOHN LEE.

References Cited in the file of this patent

UNITED STATES PATENTS

| Number | Name | Date |
| --- | --- | --- |
| 2,560,046 | Alliger | July 10, 1951 |